United States Patent
Yin et al.

(10) Patent No.: US 12,477,576 B2
(45) Date of Patent: Nov. 18, 2025

(54) CHANNEL OCCUPANCY FOR WIRELESS COMMUNICATION

(71) Applicant: QUALCOMM Incorporated, San Diego, CA (US)

(72) Inventors: Yue Yin, Beijing (CN); Shuping Chen, Beijing (CN); Yan Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 17/927,306

(22) PCT Filed: Jul. 15, 2020

(86) PCT No.: PCT/CN2020/102050
§ 371 (c)(1),
(2) Date: Nov. 22, 2022

(87) PCT Pub. No.: WO2022/011587
PCT Pub. Date: Jan. 20, 2022

(65) Prior Publication Data
US 2023/0209594 A1     Jun. 29, 2023

(51) Int. Cl.
*H04W 74/0808*     (2024.01)
*H04B 17/318*     (2015.01)

(52) U.S. Cl.
CPC ...... *H04W 74/0808* (2013.01); *H04B 17/318* (2015.01)

(58) Field of Classification Search
CPC ....... H04W 4/40; H04W 72/40; H04W 72/25; H04W 4/46; H04W 52/383;
(Continued)

(56) References Cited

U.S. PATENT DOCUMENTS

| 10,425,959 B2 | 9/2019 | Li et al. |
| 2014/0031045 A1* | 1/2014 | Kosseifi ............. H04W 36/322 455/440 |

(Continued)

FOREIGN PATENT DOCUMENTS

| CN | 110463291 A | 11/2019 |
| EP | 1056243 A2 | 11/2000 |

OTHER PUBLICATIONS

Huawei, et al., "Sidelink Resource Allocation Mode 2 for NR V2X", 3GPP TSG RAN WG1 #99, R1-1911884, 3rd Generation Partnership Project, Mobile Competence Centre, 650, Route Des Lucioles, F-06921 Sophia-Antipolis Cedex, France, vol. RAN WG1, No. Reno, USA, Nov. 18-Nov. 22, 2019, Nov. 9, 2019, XP051823066, 14 Pages, The Whole Document.

(Continued)

*Primary Examiner* — Yee F Lam
(74) *Attorney, Agent, or Firm* — Loza & Loza LLP

(57) ABSTRACT

Aspects relate to estimating occupancy of a wireless communication channel. A first user equipment (e.g., a first sidelink device) may transmit to a second user equipment (e.g., a second sidelink device) via one or more subchannels allocated for device-to-device communication. The second user equipment may also transmit to the first user equipment via one or more of the subchannels. To mitigate interference on the subchannels, the second user equipment may measure received signal strength on the subchannels to estimate the occupancy of the subchannels (e.g., by calculating a channel busy ratio). In addition, the second user equipment may account for signal leakage from a first subchannel (e.g., on which the first user equipment is transmitting data) onto a second subchannel. As a result, subchannels that may otherwise be indicated as occupied due to leakage may instead (Continued)

by indicated as unoccupied, thereby improving the accuracy of the channel occupancy estimation.

28 Claims, 13 Drawing Sheets

(58) Field of Classification Search
CPC .......... H04W 74/0808; H04W 52/0245; H04B 17/328; H04B 17/309
See application file for complete search history.

(56) References Cited

U.S. PATENT DOCUMENTS

| | | | |
|---|---|---|---|
| 2015/0282043 A1 | 10/2015 | Fang et al. | |
| 2018/0332564 A1* | 11/2018 | Lee | H04L 67/12 |
| 2019/0116475 A1* | 4/2019 | Lee | H04W 72/542 |
| 2019/0150197 A1* | 5/2019 | Sheu | H04W 74/0816 |
| | | | 370/329 |
| 2019/0200366 A1* | 6/2019 | Park | H04W 72/542 |
| 2019/0239112 A1* | 8/2019 | Rao | H04L 1/08 |
| 2020/0059915 A1 | 2/2020 | Lee et al. | |
| 2020/0120685 A1* | 4/2020 | Lee | H04W 72/02 |
| 2020/0351859 A1* | 11/2020 | Chae | H04W 72/20 |
| 2022/0159720 A1* | 5/2022 | Tao | H04W 74/0808 |

OTHER PUBLICATIONS

OPPO: "Discussions on Resource Reservation, Sensing and Selection in Mode 2," 3GPP TSG-RAN WG1 Meeting #99, R1-1912794, 3rd Generation Partnership Project, Mobile Competence Centre, 650, Route Des Lucioles, F-06921, Sophia-Antipolis Cedex, France, vol. RAN WG1, No. Reno, USA, Nov. 18-Nov. 22, 2019, Nov. 8, 2019, 12 Pages.
Supplementary European Search Report—EP20945145—Search Authority—The Hague—Feb. 27, 2024.
International Search Report and Written Opinion—PCT/CN2020/102050—ISA/EPO—Apr. 15, 2021.

\* cited by examiner

| CBR measured | PPPP 1-2 CR Limit | PPPP 3-5 CR Limit | PPPP 6-8 CR Limit |
|---|---|---|---|
| $0 \leq$ CBR measured $\leq 0.3$ | No Limit | No Limit | No Limit |
| $0.3 \leq$ CBR measured $\leq 0.6$ | No Limit | 0.03/150 | 0.23/100 |
| $0.6 \leq$ CBR measured $\leq 0.8$ | 0.02/150 | 0.006/30 | 0.004/20 |
| $0.8 \leq$ CBR measured $\leq 1$ | 0.02/150 | 0.004/20 | 0.002/10 |

FIG. 6

CHANNEL OCCUPANCY FOR WIRELESS COMMUNICATION

CROSS-REFERENCE TO RELATED APPLICATION

This application is the U.S. national stage of PCT patent application number PCT/CN2020/102050 filed on Jul. 15, 2020.

TECHNICAL FIELD

The technology discussed below relates generally to wireless communication and, more particularly, to determining occupancy of a wireless communication channel.

BACKGROUND

In many existing wireless communication systems, a cellular network is implemented by enabling wireless user equipment to communicate with one another through signaling with a nearby base station or cell. As a user equipment moves across a service area, handovers take place such that each user equipment maintains communication with one another via its respective cell.

Another scheme for a wireless communication system is a mesh or peer to peer (P2P) network, in which a user equipment may signal one another directly, rather than via an intermediary base station or cell. Somewhat in between these schemes is a system configured for sidelink signaling. With sidelink signaling, a wireless user equipment communicates in a cellular system, generally under the control of a base station. However, the wireless user equipment is further configured for sidelink signaling directly between user equipment without transmissions passing through the base station.

One example of a wireless communication system that may employ sidelink signaling is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

As the demand for sidelink communication increases, research and development continue to advance sidelink technologies not only to meet the growing demand for sidelink, but also to advance and enhance the communication experience.

BRIEF SUMMARY OF SOME EXAMPLES

The following presents a summary of one or more aspects of the present disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

Various aspects of the disclosure relate to estimating occupancy of a wireless communication channel for device-to-device (D2D) communication (e.g., V2X communication). For convenience, a user equipment that supports V2X communication or other D2D communication may be referred to herein as a sidelink device.

A first user equipment (e.g., a first sidelink device) may transmit data to a second user equipment (e.g., a second sidelink device) via one or more subchannels allocated for D2D communication. The second user equipment may also transmit data to the first user equipment via one or more of the subchannels. To mitigate interference on the subchannels, the second user equipment may measure received signal strength on the subchannels to estimate the occupancy of the subchannels. For example, the second user equipment may calculate a channel busy ratio (CBR) that indicates, for a defined period of time, the ratio of the number of subchannels that have a received signal strength greater than a CBR threshold to the total number of subchannels. To mitigate interference on the subchannels, as the CBR increases, the number of subchannels that the second user equipment is allowed to use for a transmission may be reduced.

In some scenarios, data transmissions by the first user equipment on the first subchannel may "leak" into adjacent subchannels such that energy from these data transmissions may be detected at the second user equipment in the adjacent subchannels. Conventionally, this leakage could result in a subchannel being categorized as occupied even though there is no intended data transmission on the subchannel.

In some examples, the second user equipment may account for signal leakage from a first subchannel onto a second subchannel when estimating the channel occupancy (e.g., CBR). By accounting for this leakage, subchannels that may otherwise be categorized as occupied (due to the leakage) may instead be categorized as unoccupied, thereby improving the accuracy of the channel occupancy estimation.

In some examples, a method of wireless communication at a user equipment may include successfully decoding first data on a first subchannel of a plurality of subchannels, designating the first subchannel as occupied after successfully decoding the first data on the first subchannel, failing to successfully decode second data on a second subchannel of the plurality of subchannels, designating the second subchannel as unoccupied after failing to successfully decode the second data on the second subchannel, and calculating a channel busy ratio (CBR) for the user equipment based on the designating the first subchannel as occupied and the designating the second subchannel as unoccupied.

In some examples, a user equipment may include a transceiver, a memory, and a processor communicatively coupled to the transceiver and the memory. The processor and the memory may be configured to successfully decode first data received via the transceiver on a first subchannel of a plurality of subchannels, designate the first subchannel as occupied after successfully decoding the first data on the first subchannel, fail to successfully decode second data on a second subchannel of the plurality of subchannels, designate the second subchannel as unoccupied after failing to successfully decode the second data on the second subchannel, and calculate a channel busy ratio (CBR) for the user equipment based on the designating the first subchannel as occupied and the designating the second subchannel as unoccupied.

In some examples, a user equipment may include means for decoding, wherein the means for decoding successfully decodes first data on a first subchannel of a plurality of subchannels, means for designating the first subchannel as occupied after successfully decoding the first data on the first subchannel, wherein the means for decoding does not successfully decode second data on a second subchannel of the plurality of subchannels, means for designating the second subchannel as unoccupied after failing to successfully decode the second data on the second subchannel, and means for calculating a channel busy ratio (CBR) for the user equipment based on the designating the first subchannel as occupied and the designating the second subchannel as unoccupied.

In some examples, an article of manufacture for use by a user equipment includes a computer-readable medium having stored therein instructions executable by one or more processors of the user equipment to successfully decode first data on a first subchannel of a plurality of subchannels, designate the first subchannel as occupied after successfully decoding the first data on the first subchannel, fail to successfully decode second data on a second subchannel of the plurality of subchannels, designate the second subchannel as unoccupied after failing to successfully decode the second data on the second subchannel, and calculate a channel busy ratio (CBR) for the user equipment based on the designating the first subchannel as occupied and the designating the second subchannel as unoccupied.

These and other aspects of the disclosure will become more fully understood upon a review of the detailed description, which follows. Other aspects, features, and embodiments of the present disclosure will become apparent to those of ordinary skill in the art, upon reviewing the following description of specific embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while certain embodiments may be discussed below as device, system, or method embodiments it should be understood that such embodiments can be implemented in various devices, systems, and methods.

BRIEF DESCRIPTION OF THE DRAWINGS

FIG. 6 is a table of an example of channel occupancy limits according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
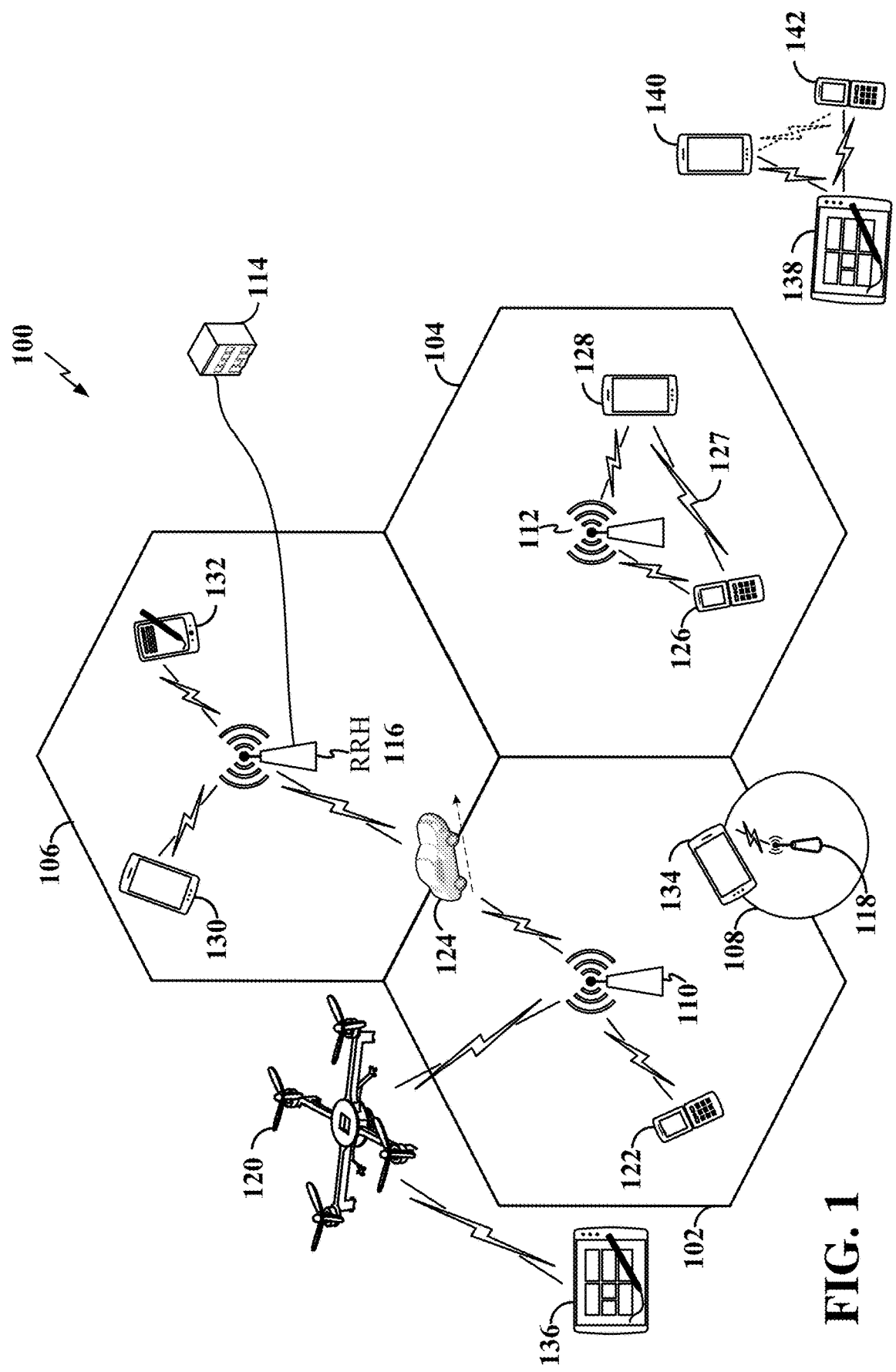
FIG. 1 is a conceptual illustration of an example of a wireless radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a relatively large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes mobile base station 120 (e.g., a quadcopter or a drone configured to function as a base station). That is, in some examples, a cell might not necessarily be stationary, and the geographic area of the cell may move according to the location of the mobile base station 120 (e.g., the quadcopter or drone).

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116;

UE 134 may be in communication with base station 118; and UE 136 may be in communication with the mobile base station 120. Here, each base station 110, 112, 114, 118, and 120 may be configured to provide an access point to a core network (not shown) for all the UEs in the respective cells. In another example, a mobile network node (e.g., the mobile base station 120) may be configured to function as a UE. For example, the mobile base station 120 may operate within cell 102 by communicating with the base station 110.

Wireless communication between a RAN 100 and a UE (e.g., the UE 122 or 124) may be described as utilizing an air interface. Transmissions over the air interface from a base station (e.g., the base station 110) to one or more UEs (e.g., the UEs 122 and 124) may be referred to as downlink (DL) transmission. In accordance with certain aspects of the present disclosure, the term downlink may refer to a point-to-multipoint transmission originating at a scheduling entity (described further below; e.g., the base station 110). Another way to describe this scheme may be to use the term broadcast channel multiplexing. Transmissions from a UE (e.g., the UE 122) to a base station (e.g., the base station 110) may be referred to as uplink (UL) transmissions. In accordance with further aspects of the present disclosure, the term uplink may refer to a point-to-point transmission originating at a scheduled entity (described further below; e.g., the UE 122).

For example, DL transmissions may include unicast or broadcast transmissions of control information and/or traffic information (e.g., user data traffic) from a base station (e.g., the base station 110) to one or more UEs (e.g., the UEs 122 and 124), while UL transmissions may include transmissions of control information and/or traffic information originating at a UE (e.g., the UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast synchronization signals (e.g., Primary Synchronization Signals (PSSs), Secondary Synchronization Signals (SSSs) and Physical Broadcast Channels (PBCH)). The UEs 122, 124, 126, 128, 130, and 132 may receive the synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified in some examples, the synchronization signal might not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity.

That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, the UE 138 is illustrated communicating with UEs 140 and 142. In some examples, the UE 138 is functioning as a scheduling entity or a primary sidelink device, and the UEs 140 and 142 may function as a scheduled entity or a non-primary (e.g., secondary) sidelink device. For example, the UE 138 may function as a scheduling entity in a device-to-device (D2D), peer-to-peer (P2P), vehicle-to-everything (V2X), and/or in a mesh network. In a mesh network example, the UEs 140 and 142 may optionally communicate directly with one another in addition to communicating with a scheduling entity (e.g., the UE 138).

In some aspects of the present disclosure, two or more UEs (e.g., the UEs 126 and 128) within the coverage area of a serving base station 112 may communicate with each other using sidelink signals 127 without relaying that communication through the base station 112. In this example, one or both of the UEs 126 and 128 may function as scheduling entities to schedule sidelink communication therebetween. For example, the UEs 126 and 128 may communicate sidelink signals 127 within a V2X network.

Two primary technologies that may be used by V2X networks include dedicated short range communication (DSRC) based on IEEE 802.11p standards and cellular V2X (C-V2X) based on LTE and/or 5G (New Radio) standards. Various aspects of the present disclosure may relate to New Radio (NR) cellular V2X networks, referred to herein as V2X networks, for convenience. However, it should be understood that the concepts disclosed herein may not be limited to a particular V2X standard or may be directed to sidelink networks other than V2X networks.

Figure 2:
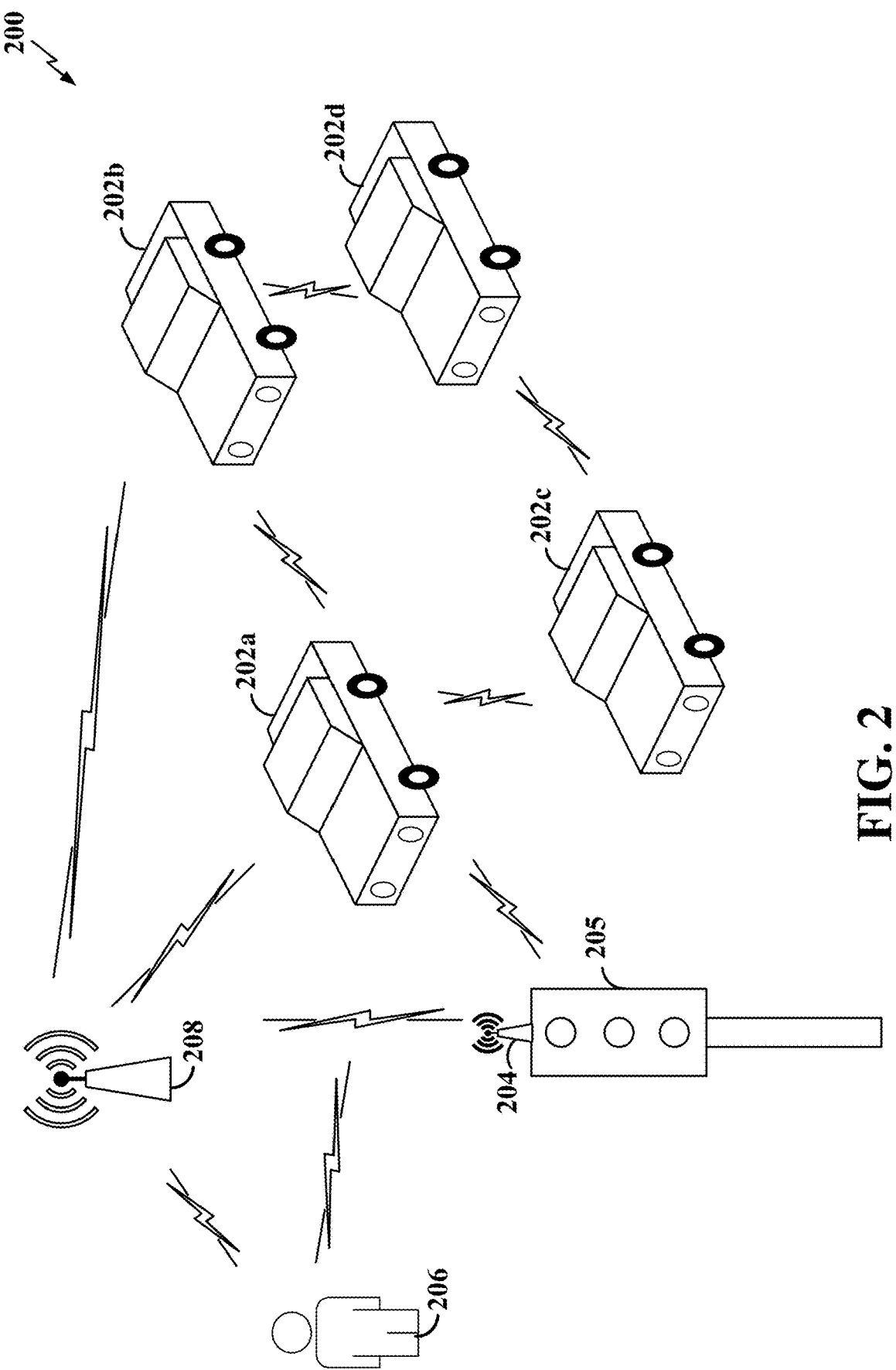
FIG. 2 is a conceptual illustration of an example of a vehicle-to-everything (V2X) wireless communication network according to some aspects.

FIG. 2 illustrates an example of a vehicle-to-everything (V2X) wireless communication network 200. A V2X network can connect vehicles 202a-202d to each other (vehicle-to-vehicle (V2V)), to roadway infrastructure 205 (vehicle-to-infrastructure (V2I)), to mobile devices 206 of pedestrians/cyclists (vehicle-to-pedestrian (V2P) (e.g., mobile devices, such as user equipment (UE) and/or wearables of pedestrians/cyclists)), and/or to the network 208 (vehicle-to-network (V2N)). In some examples, the UEs (e.g., mobile devices) and other communication devices of FIG. 2 may correspond to any of the UEs or other communication devices of FIG. 1.

A V2I transmission may be between a vehicle (e.g., vehicle 202a) and a roadside unit (RSU) 204, which may be coupled to various infrastructure 205, such as a traffic light, building, streetlight, traffic camera, tollbooth, or other stationary object. The RSU 204 may act as a base station enabling communication between vehicles 202a-202d, between vehicles 202a-202d and the RSU 204 and between vehicles 202a-202d and mobile devices 206 of pedestrians/cyclists. The RSU 204 may further exchange V2X data gathered from the surrounding environment, such as a connected traffic camera or traffic light controller, V2X connected vehicles 202a-202d, and mobile devices 206 of pedestrians/cyclists, with other RSUs 204 and distribute that V2X data to V2X connected vehicles 202a-202d and mobile devices 206 of pedestrians/cyclists. Examples of V2X data may include status information (e.g., position, speed, acceleration, trajectory, etc.) or event information (e.g., traffic jam, icy road, fog, pedestrian crossing the road, collision, etc.), and may also include video data captured by a camera on a vehicle or coupled to an RSU 204.

Such V2X data may enable autonomous driving and improve road safety and traffic efficiency. For example, the exchanged V2X data may be utilized by a V2X connected vehicle 202a-202d to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected to a mobile device 206 of a pedestrian/ cyclist may be utilized to trigger a warning sound, vibration, flashing light, etc., in case of imminent danger.

V2N communication may utilize traditional cellular links to provide cloud services to a V2X device (e.g., within a vehicle 202a-202d or RSU 204, or carried by a pedestrian/cyclist) for latency-tolerant use cases. For example, V2N may enable a V2X network server to broadcast messages (e.g., weather, traffic, or other information) to V2X devices over a wide area network and may enable V2X devices to send unicast messages to the V2X network server. In addition, V2N communication may provide backhaul services for RSUs 204.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
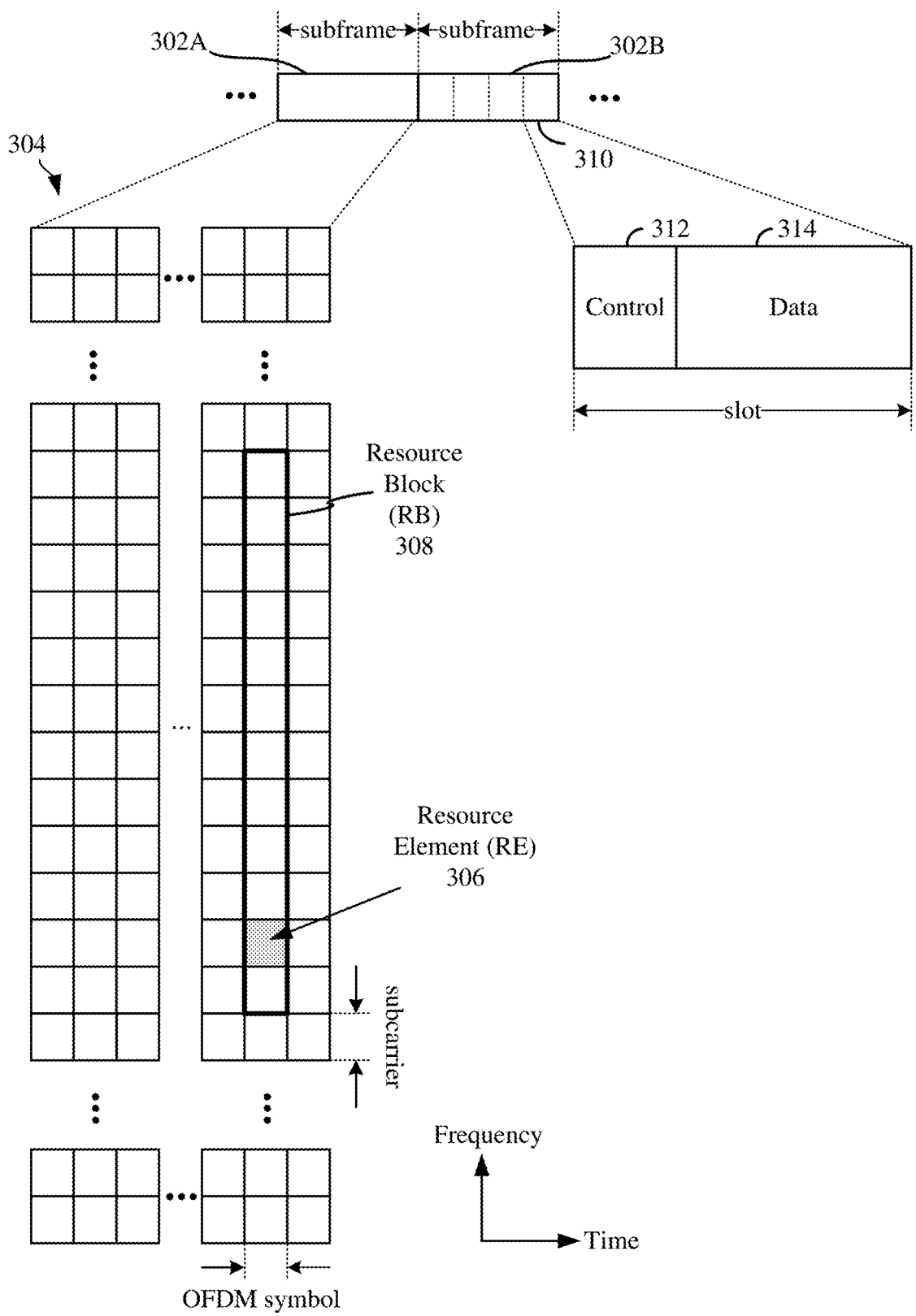
FIG. 3 is a schematic diagram illustrating organization of wireless resources in an air interface utilizing orthogonal frequency divisional multiplexing (OFDM) according to some aspects.

Referring now to FIG. 3, an expanded view of an example subframe 302A is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs or V2X devices for downlink, uplink, or sidelink transmissions typically involves scheduling one or more resource elements 306 within one or more subbands. Thus, a UE or V2X device generally utilizes only a subset of the resource grid 304. In some examples, an RB may be the smallest unit of resources that can be allocated to a UE/V2X device. Thus, the more RBs scheduled for a UE/V2X device, and the higher the modulation scheme chosen for the air interface, the higher the data rate for the UE/V2X device. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 millisecond (ms) subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

As mentioned above, a first user equipment may transmit to a second user equipment via one or more subchannels allocated for D2D (e.g., C-V2X) communication and the second user equipment may transmit to the first user equipment via one or more of the subchannels. To mitigate interference on the subchannels, the second user equipment may measure received signal strength on the subchannels to estimate the occupancy of the subchannels. For example, the second user equipment may calculate a channel busy ratio (CBR) that indicates, for a defined period of time (e.g., one second), the ratio of number of occupied subchannels to the total number of subchannels. In some examples, the number of occupied subchannels is defined as the number of subchannels that have a received signal strength greater than a CBR threshold. To mitigate interference on the subchannels, the number of subchannels that the second user equipment is allowed to use for a transmission may depend on the CBR. For example, if the CBR is low (the subchannels are lightly used), the second user equipment may be allowed to use a relatively large number (or percentage) of the subchannels. Conversely, if the CBR is high (the subchannels are heavily used), the second user equipment may be restricted to use a smaller number (or percentage) of the subchannels.

Figure 4:
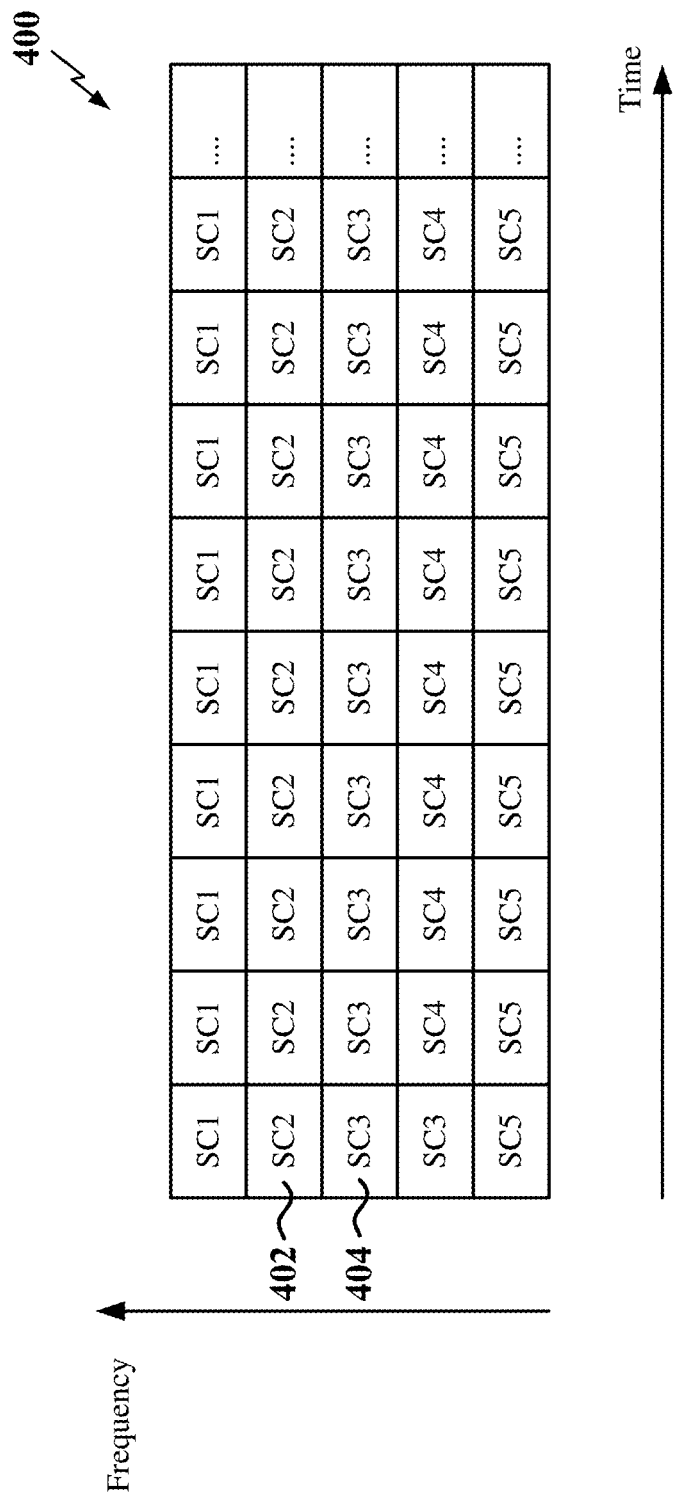
FIG. 4 is a conceptual illustration of an example of subchannels according to some aspects.

FIG. 4 illustrates an example of subchannels 400 for C-V2X communication. In this example, a subchannel consists of a group of resource blocks (RBs) that are allocated for C-V2X to facilitate resource selection. In some examples, C-V2X physical layer resources are allocated on a per subchannel basis. The subchannels 400 are one example of subchannels under a 10 MHz resource pool condition, where each subchannel (abbreviated as SC) consists of 10 RBs. Other subchannel configurations or other resource allocations could be used in other examples.

As mentioned above, channel occupation may be measured using a channel busy ratio (CBR). In some examples, CBR may be measured as the fraction of subchannels (out of the total number of subchannels allocated for user equipment communication) where the measured sidelink RSSI (S-RSSI) for that subchannel exceeds a configured CBR S-RSSI threshold.

Figure 5:
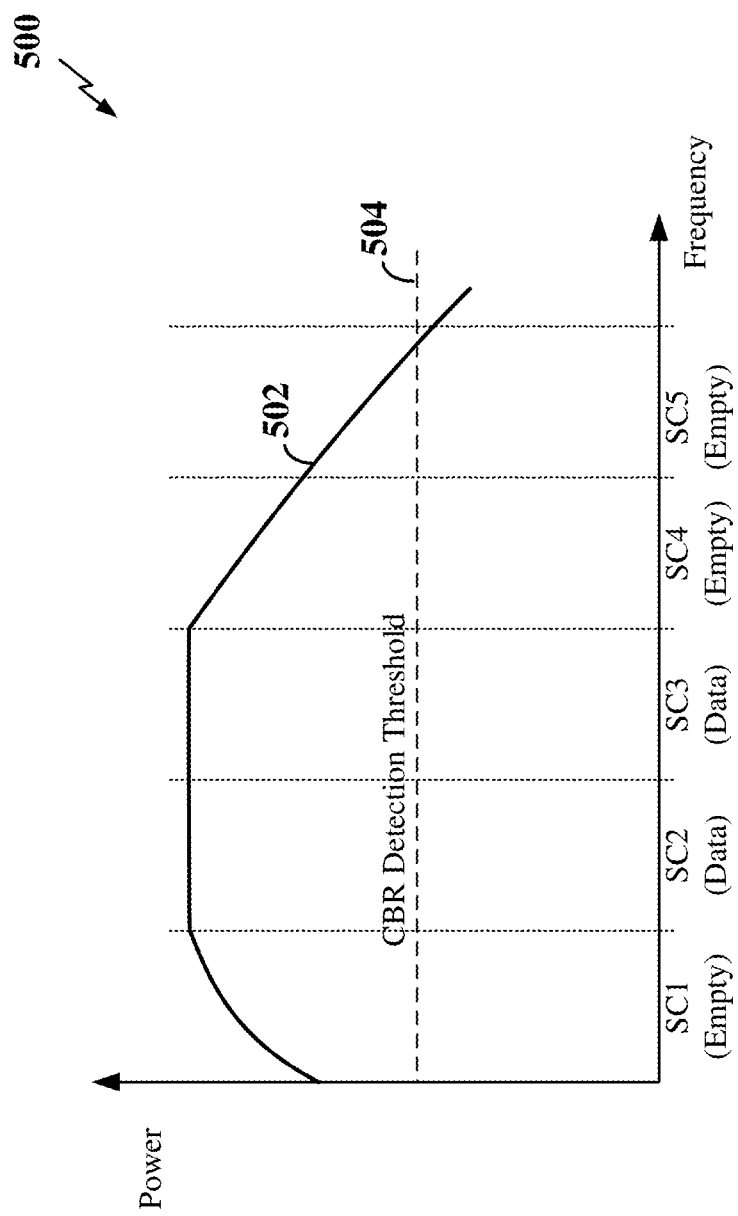
FIG. 5 is a graph illustrating a conceptual example of adjacent channel leakage according to some aspects.

In some scenarios, data transmissions by the first user equipment on the first subchannel may "leak" into adjacent subchannels such that energy from these data transmissions may be detected at the second user equipment in the adjacent subchannels. For example, adjacent channel leakage may occur when a pair of C-V2X devices that are communicating with each other are relatively close to each other. Referring to FIG. 4, if only two subchannels (e.g., SC2 402 and SC3 404) are used to transmit data during a given time period, the power of all five subchannels (e.g., SC1, SC4, and SC5) as measured at a receiver during the time period may be above the CBR RSSI threshold due to leakage from the two data subchannels. The graph 500 of FIG. 5 illustrates an example of this scenario where the (hypothetical) measured received power 502 for each of SC1 to SC5 exceeds a CBR detection threshold 504 (e.g., CBR S-RSSI threshold) even though data is not being transmitted in SC1, SC4, and SC5.

Conventionally, this leakage could result in a subchannel being categorized as occupied even though there is no intended data transmission on the subchannel. Thus, the adjacent channel leakage may result in an inaccurate calculation of CBR (higher than the actual traffic condition). A high CBR may result in a transmitter operating in a so-called loaded region where a channel occupancy ratio limit (CR_limit) caps the upper bound of the available resources for the user equipment. For example, FIG. 6 illustrates CR-limits 600 for high priority data (ProSe Per Packet Priority (PPPP) 1-2 602), medium priority data (PPPP 3-5 604), and low priority data (PPPP 6-8 606). As the measured CBR 608 (e.g., the CBR calculated from RSSI measurements) increases, the resources that the user equipment is allowed to use for a transmission decreases. For example, for PPPP 3-5 604, when the CBR larger than 0.6 and less than 0.8, there are only 30 subchannels available (block 610) during a defined period of time (e.g., 1 second). When the CBR larger than 0.8, there are only 20 subchannels (block 612) available during the defined period of time (e.g., 1 second). If, for a given transmission by a user equipment, each packet need two subchannels and transmits two times (one initial transmission+one retransmission), for a packet with 100 millisecond periodicity, 40 subchannels are need. If the CBR is greater than 0.6 as discussed above, this would cause the user equipment start to drop packets due to the congestion control algorithm.

In some examples, the leakage may be relatively high at the host node/transmitter, but not necessarily high at the receiver(s) side. Thus, even if the leakage is high at the receiver(s) side, the leakage may be lower than the useful signal power. Consequently, the message may still be decodable at the receiver side even with the leakage in the subchannels.

The disclosure relates in some aspects to a CBR calculation that mitigates (e.g., eliminates) the effect of this leakage on the CBR and thereby prevents the user equipment from operating in the loaded region unnecessarily (and dropping packets unnecessarily). By accounting for this leakage, subchannels that may otherwise be categorized as occupied (due to the leakage) may instead be categorized as unoccupied, thereby improving the accuracy of the channel occupancy estimation.

For example, when some subchannels are transmitting data and adjacent subchannels are not, even if the adjacent channels have an RSSI greater than the RSSI threshold, the adjacent channels may be deemed as interfered yet treated as empty channels when doing the CBR calculation. In some aspects, this may involve deeming the RSSI on these adjacent subchannels as smaller than the CBR threshold.

Alternatively and/or in addition, in some examples, a user equipment may, at the receiver side, reconstruct the signal power mask of the transmitter and deduce the energy from the total RSSI. The receiver user equipment may then use the new RSSI value to make the comparison with the RSSI threshold to determine the CBR. When reconstructing the signal mask in this way, the pathloss between the particular transmitter and the receiver may be used to determine the leakage effect as expected to be seen at the receiver. In some examples, this pathloss may be estimated by assuming that the transmit power of the transmitting user equipment is 23 dBm (e.g., as specified in a standard).

In some examples, designating an adjacent subchannel as unoccupied may be based on whether the RSSI of the adjacent channel is lower than the RSSI of the subchannel(s) containing data. In some aspects, this is to confirm that the adjacent subchannel is actually being interfered with by the busy subchannels, and that a high RSSI on the subchannel is not due to some other interferences or un-decoded data.

In some examples, a determination of whether a subchannel has C-V2X data or not may involve decoding a Physical Sidelink Control Channel (PSCCH). Advantageously, this decoding may be performed by a user equipment for other purposes (e.g., for resource selection). Accordingly, subchannel decoding for congestion control might not significantly impact processing resources and/or wireless resource access at the user equipment.

In view of the above, it should be appreciated that an accurate CBR measurement and calculation is important for C-V2X congestion control. Calculation of an accurate CBR value that reflects actual channel usage as discussed herein can improve communication performance. For example, the use of a CBR calculation as described herein may mitigate (e.g., eliminate) an unnecessary reduction in the number of subchannels that a user equipment is allowed use for a transmission that would otherwise occur if a conventional CBR scheme is used. The disclosure thus relates in some aspects to addressing inaccurate CBR measurements and calculations that are due to adjacent channel interference.

Figure 7:
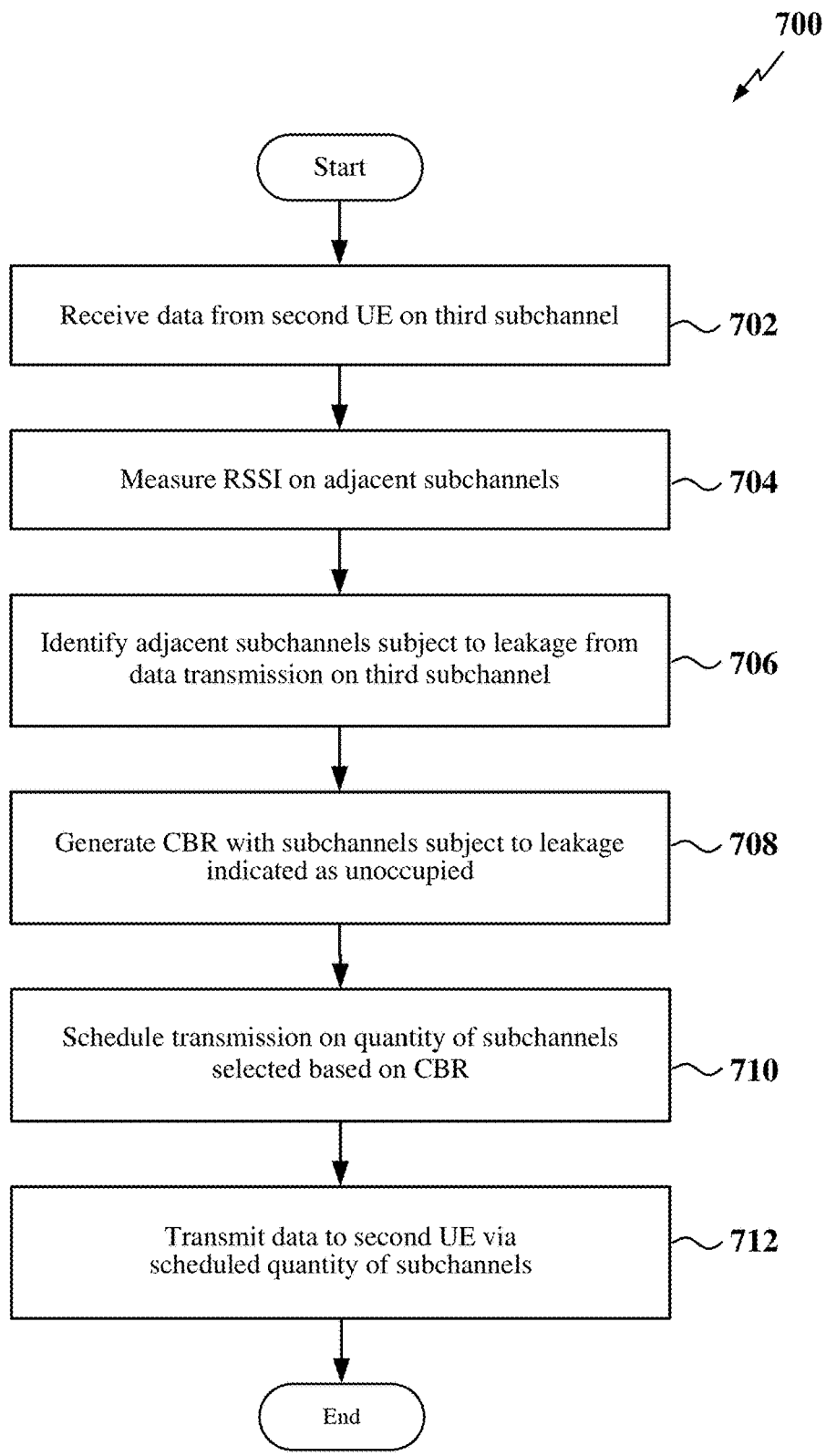
FIG. 7 is a flow chart illustrating an example of a method for scheduling communication according to some aspects.

FIG. 7 is a flow chart of a method 700 for wireless communication (e.g., over a V2X channel). As described below, some or all illustrated features may be omitted in a particular implementation within the scope of the present disclosure, and some illustrated features may not be required for implementation of all embodiments. In some examples, the method 700 may be performed by the UE 900, as described above and illustrated in FIG. 9, by a processor or processing system, or by any suitable means for carrying out the described functions.

At block 702, a first user equipment may receive data from a second user equipment on a third subchannel. For example, a first C-V2X device of the vehicle 202a of FIG. 2 may receive data transmitted by a second C-V2X device of the vehicle 202b.

At block 704, the first user equipment may measure RSSI on adjacent subchannels. For example, the first C-V2X device may measure received RSSI on a first subchannel and a second subchannel.

At block 706, the first user equipment may identify adjacent subchannels subject to leakage from data transmission on third subchannel. For example, the first C-V2X device may determine whether the RSSI measured on an adjacent subchannel is less than the RSSI measured on the third subchannel (the data channel).

At block 708, the first user equipment may generate a CBR with subchannels subject to leakage indicated as unoccupied. For example, the first C-V2X device may designate any subchannels for which the first C-V2X device could not successfully decode data as unoccupied for purposes of the CBR calculation.

At block 710, the first user equipment may schedule transmission on a quantity of subchannels selected based on CBR. For example, the first C-V2X device may calculate the number of subchannels needed for a transmission over a period of time based on how many subchannels are needed for each packet, how many retransmissions may be needed, and the periodicity of the packet.

At block 712, the first user equipment may transmit data to second UE via the scheduled quantity of subchannels. For example, the first C-V2X device may transmit via one or more of the first subchannel, the second subchannel, the fourth subchannel, or the fifth subchannel in some examples.

Figure 8:
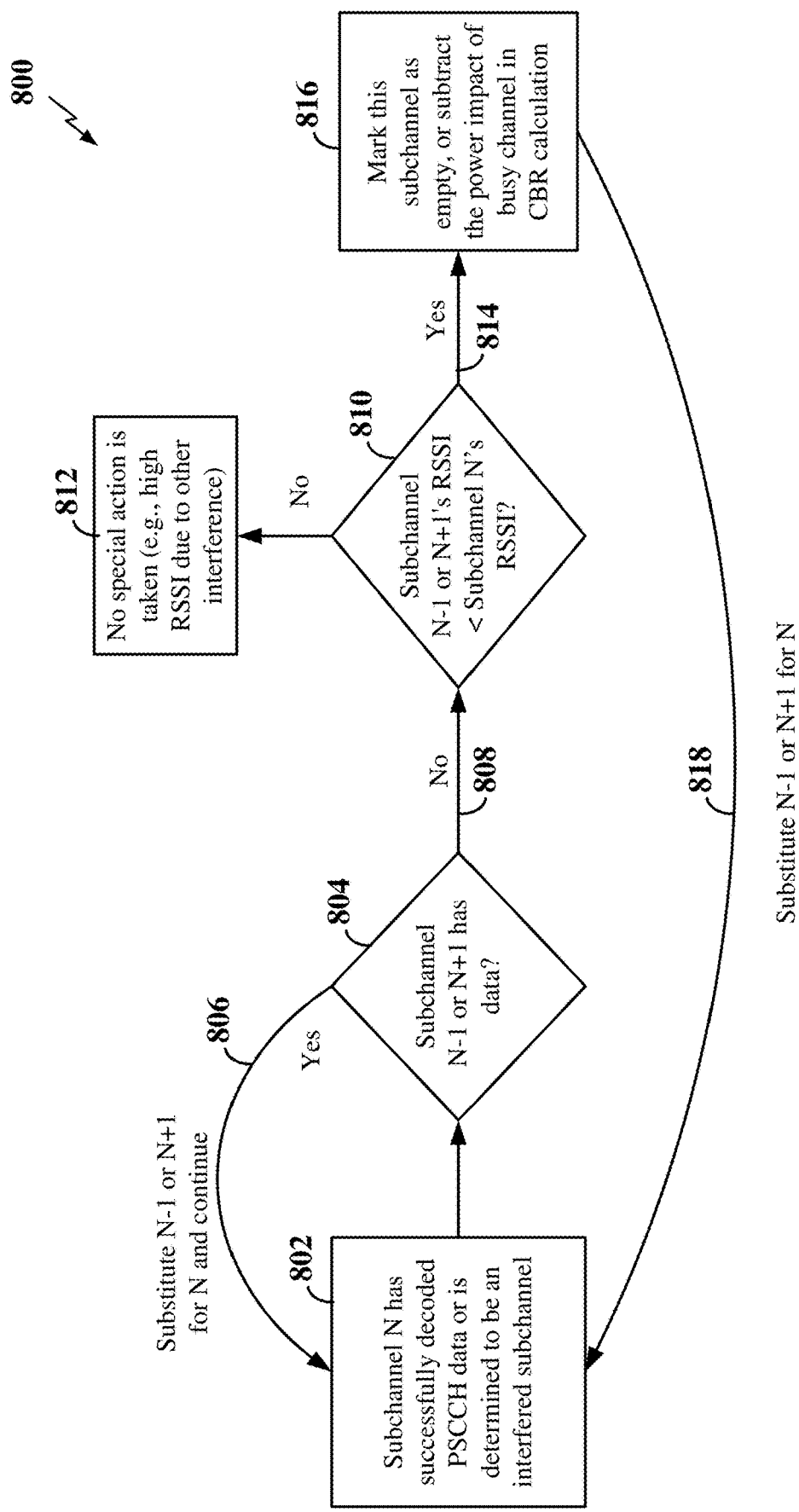
FIG. 8 is a flow chart illustrating an example of a method for determining a channel busy ratio according to some aspects.

FIG. 8 is a flow chart of a method 800 for wireless communication (e.g., over a V2X channel). As described below, some or all illustrated features may be omitted in a particular implementation within the scope of the present disclosure, and some illustrated features may not be required for implementation of all embodiments. In some examples, the method 800 may be performed by the UE 900, as described above and illustrated in FIG. 9, by a processor or processing system, or by any suitable means for carrying out the described functions.

At block 802, initially, a user equipment may determine that PSCCH data has been successfully decoded on a subchannel N.

At block 804, the user equipment may then check whether PSCCH data has been successfully decoded on an adjacent subchannel: subchannel N−1 or subchannel N+2. If so, the operational flow returns to block 802 (as indicated by a line 806) where N−1 or N+2 is substituted for N and the method 800 is repeated (e.g., for that adjacent subchannel).

If PSCCH data was not successfully decoded on the adjacent subchannel at block 804, the operational flow proceeds (as indicated by a line 808) to a block 810 where the user equipment may determine whether the measured RSSI of subchannel N−1 or N+2 is less than the RSSI of subchannel N (a data subchannel).

If not, at block 812, the user equipment may elect to not take any special action for this scenario. For example, this scenario may correspond to the case where the energy on the adjacent subchannel is due to a nearby interference source. Thus, the user equipment may designate the adjacent subchannel as occupied according to a conventional CBR scheme.

On the other hand, if the measured RSSI of subchannel N−1 or N+2 was less than the RSSI of subchannel N at block 810, the operational flow proceeds (as indicated by a line 814) to a block 816 where the user equipment may designate (e.g., mark) subchannel N−1 or N+2 as occupied (e.g., empty).

In some examples, the user equipment may attempt to remove the influence of any leakage from subchannel N (e.g., any data subchannel) in the RSSI measurement for subchannel N−1 or N+2. For example, based on a model (or other estimate) of expected leakage from one channel to another, the user equipment may subtract the expected leakage component from the measured RSSI. The resulting value may then be compared to the S-RSSI threshold to determine whether to designate the subchannel N−1 or N+2 as occupied or not. Thus, the user equipment may subtract the power impact of a subchannel potentially designated as occupied (e.g., busy) when calculating the CBR. Here, determining the leakage component of the measured RSSI may be based on the model of expected leakage mentioned above, taking into account the path loss from the transmitting user equipment to the receiving user equipment.

As indicated by a line 818, the user equipment may then substitute N−1 or N+2 for N and the method 800 is repeated (e.g., for that adjacent subchannel). In this way, the process may determine whether a subchannel that is adjacent subchannel N−1 or N+2 is subject to leakage (e.g., from subchannel N−1 or N+2).

Figure 9:
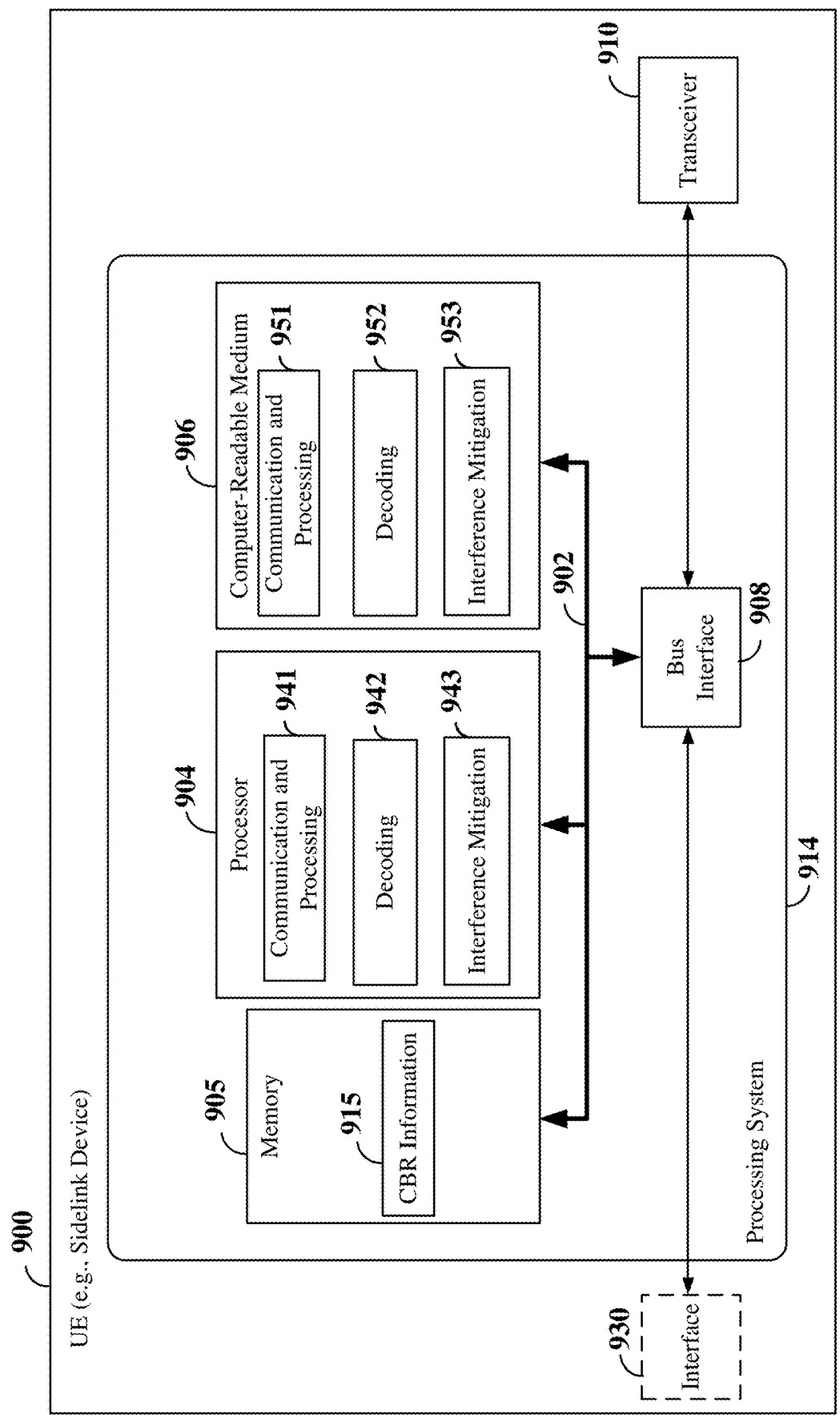
FIG. 9 is a block diagram illustrating an example of a hardware implementation for a wireless communication device employing a processing system according to some aspects.

FIG. 9 is a diagram illustrating an example of a hardware implementation for a UE 900 (e.g., a sidelink device) employing a processing system 914. For example, the UE 900 may be a UE or a V2X device as discussed in any one or more of FIGS. 1-8. In accordance with various aspects of the disclosure, an element, or any portion of an element, or any combination of elements may be implemented with a processing system 914 that includes one or more processors 904. In some implementations, the UE 900 may correspond to one or more of the UE 122, 124, 126, 128, 130, 132, 134, 138, 140, or 142 of FIG. 1 or the V2X devices of FIG. 2.

The UE 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 900 may be configured to perform any one or more of the functions described herein. That is, the processor 904, as utilized in a UE 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910 and between the bus 902 and an interface 930. The transceiver 910 provides a communication interface or means for communicating with various other apparatus over a wireless transmission medium. In some examples, the UE may include two or more transceivers 910, each configured to communicate with a respective network type (e.g., terrestrial or non-terrestrial). The interface 930 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 930 may include a user interface (e.g., keypad, display, speaker, microphone, joystick). Of course, such a user interface is optional, and may be omitted in some examples, such as an IoT device.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 900 may be configured to perform any one or more of the operations described herein (e.g., as described above in conjunction with FIGS. 1-8 and as described below in conjunction with FIGS. 10-13). In some aspects of the disclosure, the processor 904, as utilized in the UE 900, may include circuitry configured for various functions.

The processor 904 may include communication and processing circuitry 941 configured to communicate over a sidelink carrier to exchange sidelink control information and sidelink data with other sidelink devices. In some examples, the communication and processing circuitry 941 may be configured to transmit a PSCCH, which may include a sidelink synchronization signal block (S-SSB), other control information, and/or pilot signals, and/or a PSSCH, which may include sidelink data, within a radio frame based on sidelink transmission timing. In some examples, the sidelink transmission timing may be determined based on synchronization to a synchronization source (e.g., gNB, eNB, GNSS, etc.), self-synchronization to an internal timing/frequency reference, or synchronization to another sidelink device (e.g., based on a received S-SS). The communication and processing circuitry 941 may further be configured to execute communication and processing software 951 stored on the computer-readable medium 906 to implement one or more functions described herein.

In some implementations where the communication involves receiving information, the communication and processing circuitry 941 may obtain information from a component of the UE 900 (e.g., from the transceiver 910 that receives the information via radio frequency signaling or some other type of signaling suitable for the applicable communication medium), process (e.g., decode) the information, and output the processed information. For example, the communication and processing circuitry 941 may output the information to another component of the processor 904, to the memory 905, or to the bus interface 908. In some examples, the communication and processing circuitry 941 may receive one or more of signals, messages, other information, or any combination thereof. In some examples, the communication and processing circuitry 941 may receive information via one or more channels. In some examples, the communication and processing circuitry 941 may include functionality for a means for receiving.

In some implementations where the communication involves sending (e.g., transmitting) information, the communication and processing circuitry 941 may obtain information (e.g., from another component of the processor 904, the memory 905, or the bus interface 908), process (e.g., encode) the information, and output the processed information. For example, the communication and processing circuitry 941 may output the information to the transceiver 910 (e.g., that transmits the information via radio frequency signaling or some other type of signaling suitable for the applicable communication medium). In some examples, the communication and processing circuitry 941 may send one or more of signals, messages, other information, or any combination thereof. In some examples, the communication and processing circuitry 941 may send information via one or more channels. In some examples, the communication and processing circuitry 941 may include functionality for a means for sending (e.g., a means for transmitting).

The processor 904 may include decoding circuitry 942 configured to perform decoding-related operations as discussed herein. The decoding circuitry 942 may include functionality for a means for decoding data. In some examples, the means for decoding may be a decoder that is configured to decode data received via a V2X subchannel. The decoder may generate an indication of whether decoding performed on energy from a subchannel was successful (e.g., data was successfully decoded) or failed (e.g., no data was successfully decoded). The decoding circuitry 942 may further be configured to execute decoding software 952 included on the computer-readable medium 906 to implement one or more functions described herein.

The processor 904 may include interference mitigation circuitry 943 configured to perform interference mitigation-related operations as discussed herein. The interference mitigation circuitry 943 may include functionality for a means for designating a subchannel as occupied or unoccupied. The interference mitigation circuitry 943 may include functionality for a means for calculating a channel busy ratio (e.g., one or more of the algorithms discussed above in conjunction with FIGS. 7 and 8). The interference mitigation circuitry 943 may further be configured to execute interference mitigation software 953 included on the computer-readable medium 906 to implement one or more functions described herein.

Figure 10:
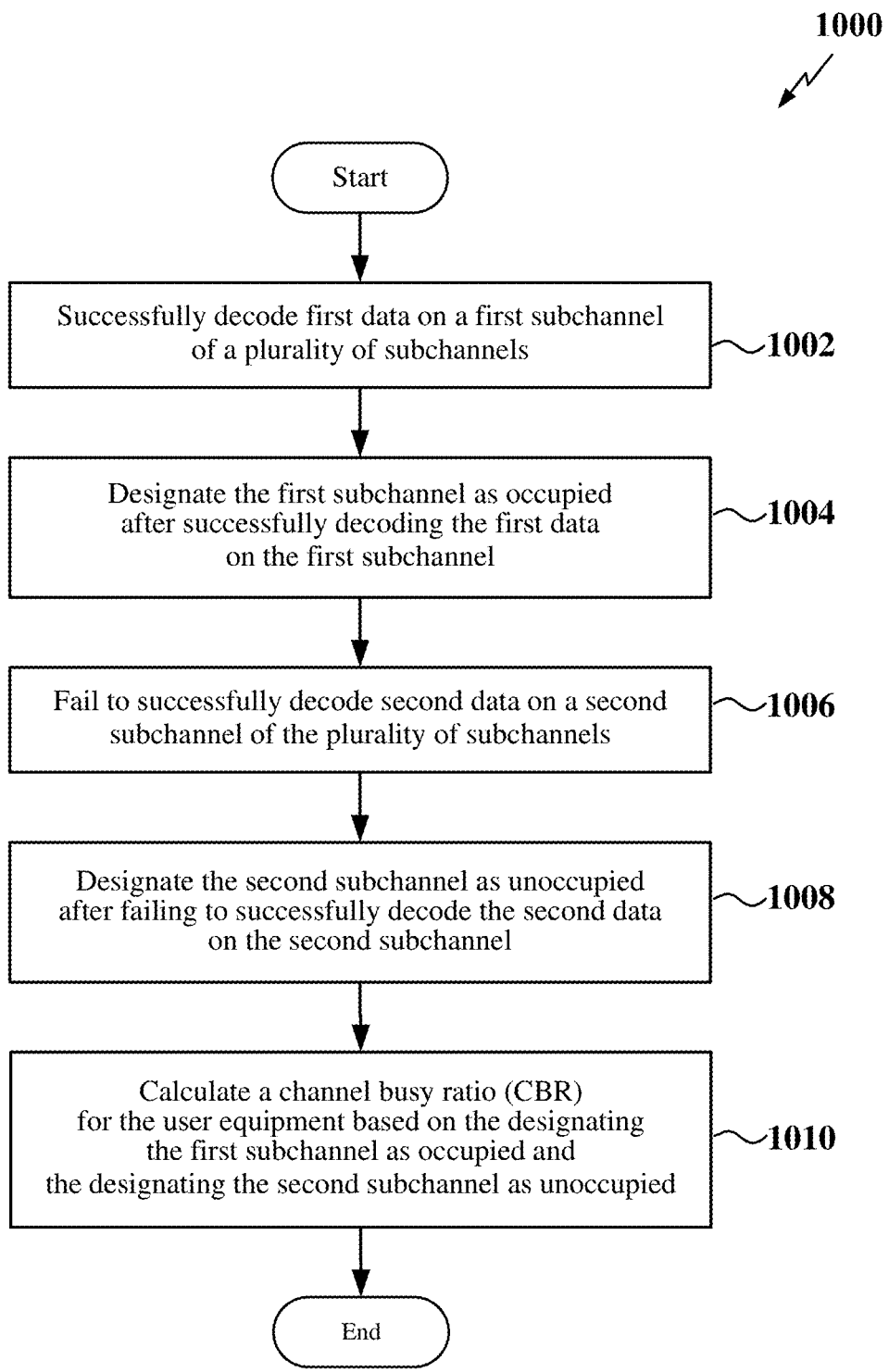
FIG. 10 is a flow chart illustrating an example of a method for determining a channel busy ratio according to some aspects.

FIG. 10 is a flow chart of a method 1000 for wireless communication (e.g., over a V2X channel). As described below, some or all illustrated features may be omitted in a particular implementation within the scope of the present disclosure, and some illustrated features may not be required for implementation of all embodiments. In some examples, the method 1000 may be performed by the UE 900, as described above and illustrated in FIG. 9, by a processor or processing system, or by any suitable means for carrying out the described functions.

At block 1002, a user equipment may successfully decode first data on a first subchannel of a plurality of subchannels. For example, the decoding circuitry 942 together with the communication and processing circuitry 941 and the transceiver 910, shown and described above in connection with FIG. 9, may receive energy on a V2X subchannel and apply one or more defined hypotheses to decode data on the subchannel. In some examples, a transmitter (e.g., another user equipment) may have indicated to the user equipment which subchannels will be used for a data transmission during a particular period of time.

In some examples, the plurality of subchannels may include subchannels allocated for vehicle to anything (V2X) communication. In some examples, the V2X communication may include 3$^{rd}$ Generation Partnership Project (3GPP) Long Term Evolution V2X communication or 3GPP 5G V2X communication.

At block 1004, a user equipment may designate the first subchannel as occupied after successfully decoding the first data on the first subchannel. For example, the interference mitigation circuitry 943, shown and described above in connection with FIG. 9, may keep track of the subchannels that carry data and mark these subchannels as occupied (e.g., busy) for a CBR calculation.

At block 1006, a user equipment may fail to successfully decode second data on a second subchannel of the plurality of subchannels. For example, the decoding circuitry 942 together with the communication and processing circuitry 941 and the transceiver 910, shown and described above in connection with FIG. 9, may attempt to receive energy on a V2X subchannel and attempt decoding on the received energy. If the decoding failed (data was not successfully decoded), the decoding circuitry 942 may generate a corresponding indication.

In some examples, a received signal power (e.g., RSSI) of the second subchannel may be greater than a channel occupancy threshold (e.g., an S-RSSI threshold). In some examples, the received signal power may include a received signal strength indication (RSSI) measured by the user equipment on the second subchannel. In some examples, the channel occupancy threshold may include a sidelink RSSI (S-RSSI) channel occupancy threshold.

In some examples, the method 1000 may further include determining that the second subchannel is immediately adjacent the first subchannel within the plurality of subchannels and initiating an attempt to decode the second data on the second subchannel after determining that the second subchannel is immediately adjacent the first subchannel.

At block 1008, a user equipment may designate the second subchannel as unoccupied after failing to successfully decode the second data on the second subchannel. For example, the interference mitigation circuitry 943, shown and described above in connection with FIG. 9, may keep track of the subchannels where data decoding was unsuccessful and mark these subchannels as unoccupied (e.g., free) for a CBR calculation.

In contrast with conventional CBR schemes where the second subchannel would be designated as occupied (e.g., due to the subchannel RSSI being greater than the S-RSSI threshold), the second subchannel may still be designated as unoccupied if the energy on the subchannel is likely due to leakage from the first subchannel (e.g., the second subchannel RSSI is less than the first subchannel RSSI).

At block 1010, a user equipment may calculate a channel busy ratio (CBR) for the user equipment based on the designating the first subchannel as occupied and the designating the second subchannel as unoccupied. For example, the interference mitigation circuitry 943, shown and described above in connection with FIG. 9, calculate a CBR as a ratio of the occupied subchannels for a period of time (e.g., one or more time slots or symbols) over the total number of subchannel for that period of time.

In some examples, the method 1000 may further include selecting a subset of subchannels of the plurality of subchannels based on the CBR, and transmitting information to another user equipment via the subset of subchannels.

In some examples, the method 1000 may further include determining that a first received signal power of the second subchannel is less than a second received signal power of the first subchannel. In this case, designating the second subchannel as unoccupied may be based on the determining that the first received signal power of the second subchannel is less than the second received signal power of the first subchannel.

In some examples, the first received signal power may include a received signal strength indication (RSSI) measured by the user equipment on the second subchannel. In some examples, the second received signal power may include an RSSI measured by the user equipment on the first subchannel.

In some examples, the method 1000 may further include calculating the first received signal power based on an estimate of leakage from the first subchannel to the second subchannel. In some examples, the method 1000 may further include measuring a received signal strength indication (RSSI) on the second subchannel, deriving the estimate of leakage, and subtracting the estimate of leakage from the RSSI on the second subchannel to provide an adjusted RSSI, and comparing the adjusted RSSI to a channel occupancy threshold. Here, designating the second subchannel as unoccupied may be based on the comparing the adjusted RSSI to the channel occupancy threshold. In some examples, the channel occupancy threshold may include a sidelink RSSI (S-RSSI) channel occupancy threshold.

In some examples, deriving the estimate of leakage may include estimating a signal power mask for another user equipment that transmitted the first data on the first subchannel and estimating signal leakage based on the signal power mask and the RSSI on the second subchannel. In some examples, deriving the estimate of leakage may include estimating a pathloss from the user equipment to another user equipment that transmitted the first data on the first subchannel and estimating signal leakage based on the pathloss and a defined leakage parameter.

In some examples, the method 1000 may further include determining that a third subchannel is immediately adjacent the second subchannel within the plurality of subchannels, failing to successfully decode third data on the third subchannel after determining that the third subchannel is immediately adjacent the second subchannel, and designating the third subchannel as unoccupied after failing to successfully decode the third data on the third subchannel. Here, calculating the channel busy ratio for the user equipment may be further based on the designating the third subchannel as unoccupied.

Figure 11:
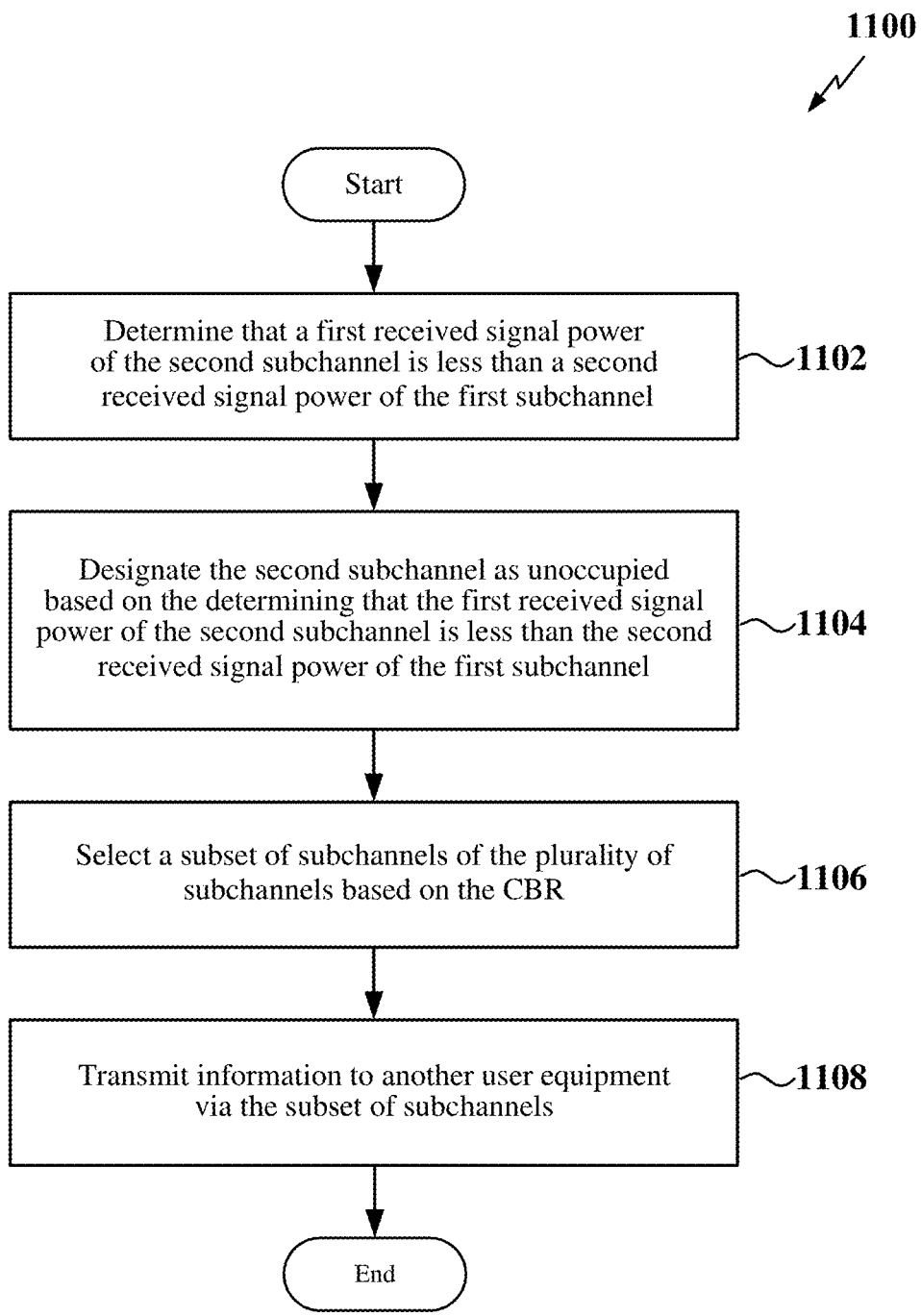
FIG. 11 is a flow chart illustrating an example of a method for selecting subchannels according to some aspects.

FIG. 11 is a flow chart of a method 1100 for wireless communication (e.g., over a V2X channel). In some examples, the method 1100 may be performed in conjunction with (e.g., as part of or in addition to) the method 1000 of FIG. 10. As described below, some or all illustrated features may be omitted in a particular implementation within the scope of the present disclosure, and some illustrated features may not be required for implementation of all embodiments. In some examples, the method 1100 may be performed by the UE 900, as described above and illustrated in FIG. 9, by a processor or processing system, or by any suitable means for carrying out the described functions.

At block 1102, a user equipment may determine that a first received signal power of the second subchannel is less than a second received signal power of the first subchannel. For example, the interference mitigation circuitry 943 together with the communication and processing circuitry 941 and the transceiver 910, shown and described above in connection with FIG. 9, may measure an RSSI of a data subchannel and an RSSI of an adjacent subcarrier and compare the RSSIs.

At block 1104, a user equipment may designate the second subchannel as unoccupied based on the determining that the first received signal power of the second subchannel is less than the second received signal power of the first subchannel. For example, the interference mitigation circuitry 943, shown and described above in connection with FIG. 9, may keep track of the subchannels where the RSSI is less than the RSSI of a data subchannel and mark these subchannels as unoccupied (e.g., free) for a CBR calculation.

At block 1106, a user equipment may select a subset of subchannels of the plurality of subchannels based on the CBR. For example, the interference mitigation circuitry 943, shown and described above in connection with FIG. 9, may determine whether the number of subchannels needed for a transmission is less than the number of subchannels permitted by a CBR (e.g., based on an a CR_limit).

At block 1108, a user equipment may transmit information to another user equipment via the subset of subchannels. For example, the communication and processing circuitry 941 and the transceiver 910, shown and described above in connection with FIG. 9, may transmit data on a V2X subchannel to another user equipment.

Figure 12:
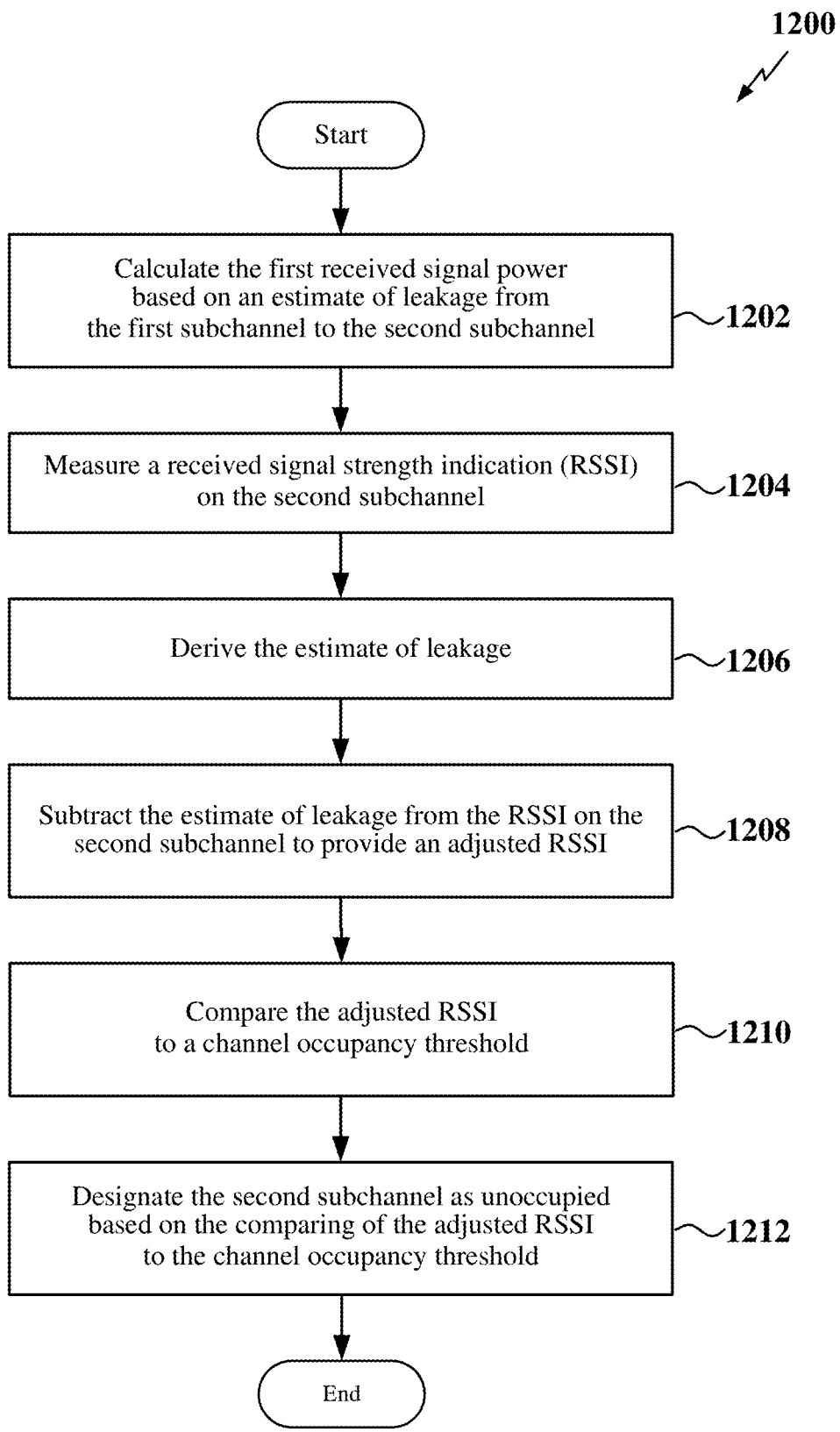
FIG. 12 is a flow chart illustrating an example of a method for determining that a subchannel is unoccupied according to some aspects.

FIG. 12 is a flow chart of a method 1200 for wireless communication (e.g., over a V2X channel). In some examples, the method 1200 may be performed in conjunction with (e.g., as part of or in addition to) the method 1000 of FIG. 10. As described below, some or all illustrated features may be omitted in a particular implementation within the scope of the present disclosure, and some illustrated features may not be required for implementation of all embodiments. In some examples, the method 1200 may be performed by the UE 900, as described above and illustrated in FIG. 9, by a processor or processing system, or by any suitable means for carrying out the described functions.

At block 1202, a user equipment may calculate the first received signal power based on an estimate of leakage from the first subchannel to the second subchannel. For example, the interference mitigation circuitry 943 together with the communication and processing circuitry 941 and the transceiver 910, shown and described above in connection with FIG. 9, may measure an RSSI of a subchannel, determine a pathloss from the transmitting user equipment, and estimate the leakage based on the measured RSSI, the pathloss, and a model of estimated leakage between subchannels.

At block 1204, a user equipment may measure a received signal strength indication (RSSI) on the second subchannel. For example, the interference mitigation circuitry 943 together with the communication and processing circuitry 941 and the transceiver 910, shown and described above in connection with FIG. 9, may measure an RSSI of a V2X subchannel.

At block 1206, a user equipment may derive the estimate of leakage. For example, the interference mitigation circuitry 943, shown and described above in connection with FIG. 9, may estimate the leakage based on the measured RSSI, pathloss on the subchannel, and a model of estimated leakage between subchannels.

At block 1208, a user equipment may subtract the estimate of leakage from the RSSI on the second subchannel to provide an adjusted RSSI. For example, the interference mitigation circuitry 943, shown and described above in connection with FIG. 9, may remove the leakage component from the RSSI measurement.

At block 1210, a user equipment may compare the adjusted RSSI to a channel occupancy threshold. For example, the interference mitigation circuitry 943, shown and described above in connection with FIG. 9, may compare the RSSI value to a CBR S-RSSI threshold.

At block 1212, a user equipment may designate the second subchannel as unoccupied based on the comparing of the adjusted RSSI to the channel occupancy threshold. For example, the interference mitigation circuitry 943, shown and described above in connection with FIG. 9, may keep track of the subchannels where the adjusted RSSI value is below a CBR S-RSSI threshold and mark these subchannels as unoccupied (e.g., free) for a CBR calculation.

Figure 13:
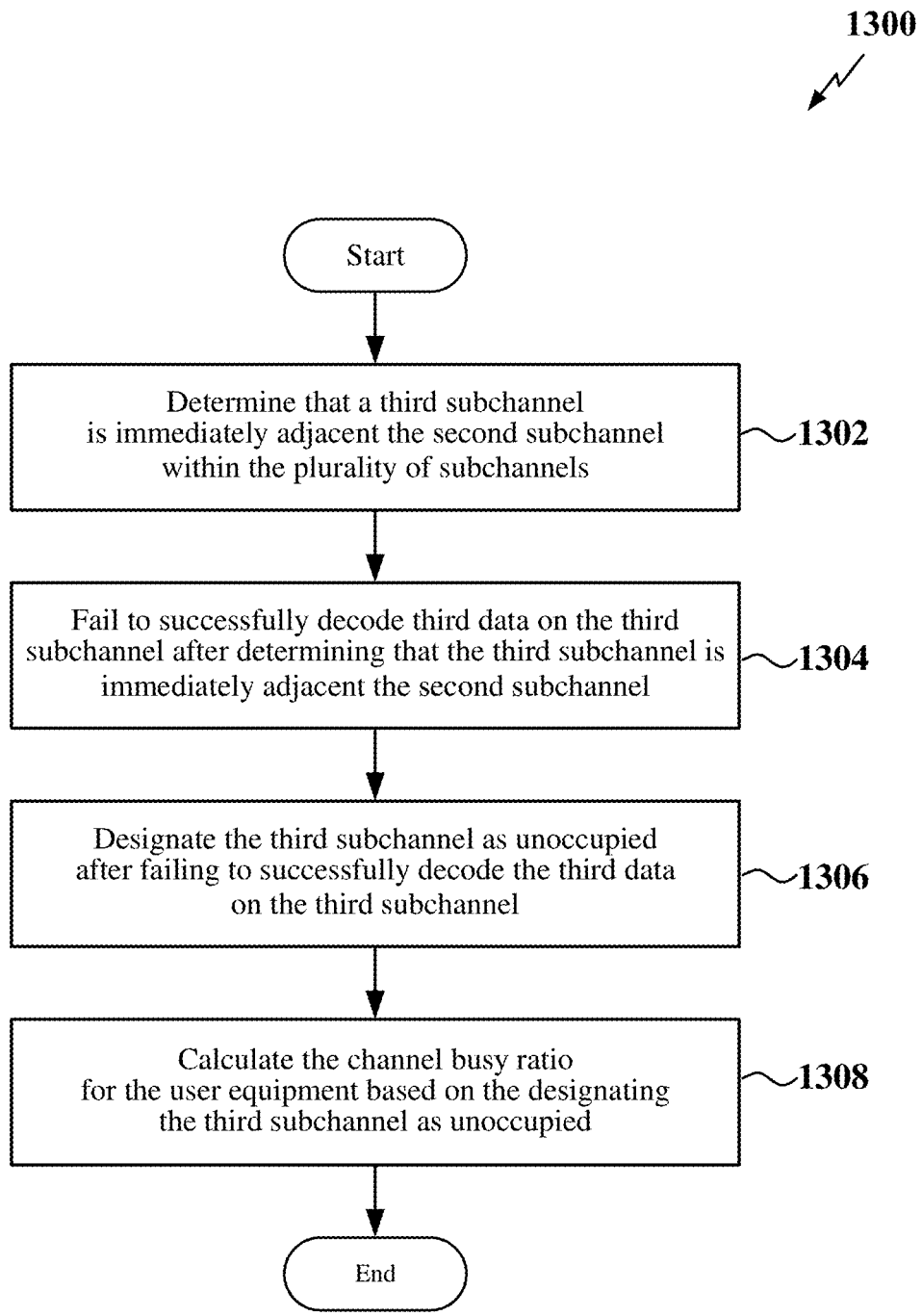
FIG. 13 is a flow chart illustrating an example of a method for determining a channel busy ratio according to some aspects.

FIG. 13 is a flow chart of a method 1300 for wireless communication (e.g., over a V2X channel). In some examples, the method 1300 may be performed in conjunction with (e.g., as part of or in addition to) the method 1000 of FIG. 10. As described below, some or all illustrated features may be omitted in a particular implementation within the scope of the present disclosure, and some illustrated features may not be required for implementation of all embodiments. In some examples, the method 1300 may be performed by the UE 900, as described above and illustrated in FIG. 9, by a processor or processing system, or by any suitable means for carrying out the described functions.

At block 1302, a user equipment may determine that a third subchannel is immediately adjacent the second subchannel within the plurality of subchannels. For example, the interference mitigation circuitry 943 together with the communication and processing circuitry 941 and the transceiver 910, shown and described above in connection with FIG. 9, may keep track of the frequency bands of all allocated subchannels and identify adjacent subchannels (e.g., identify frequency bands that are with a threshold frequency range of each other).

At block 1304, a user equipment may fail to successfully decode third data on the third subchannel after determining that the third subchannel is immediately adjacent the second subchannel. For example, the decoding circuitry 942 together with the communication and processing circuitry 941 and the transceiver 910, shown and described above in connection with FIG. 9, may attempt to receive energy on a V2X subchannel and attempt decoding on the received energy. If the decoding failed (data was not successfully decoded), the decoding circuitry 942 may generate a corresponding indication.

At block 1306, a user equipment may designate the third subchannel as unoccupied after failing to successfully decode the third data on the third subchannel. For example, the interference mitigation circuitry 943, shown and described above in connection with FIG. 9, may keep track of the subchannels where data decoding was unsuccessful and mark these subchannels as unoccupied (e.g., free) for a CBR calculation.

At block 1308, a user equipment may calculate the channel busy ratio for the user equipment based on the designating the third subchannel as unoccupied. For example, the interference mitigation circuitry 943, shown and described above in connection with FIG. 9, calculate a CBR as a ratio of the occupied subchannels for a period of time (e.g., one or more time slots or symbols) over the total number of subchannel for that period of time.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIG. 1, 2, or 9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication at a user equipment, the method comprising:
    decoding first data on a first subchannel of a plurality of subchannels;
    calculating a first received signal power associated with a second subchannel of the plurality of subchannels based on an estimate of leakage from the first subchannel to the second subchannel;
    designating the second subchannel as unoccupied based on a failure to successfully decode second data on the second subchannel, wherein the designating the second subchannel as unoccupied is further based on the first received signal power associated with the second subchannel being less than a second received signal power associated with the first subchannel; and
    transmitting a first transmission via the second subchannel according to a channel busy ratio (CBR) for the user equipment that is based on the designating the second subchannel as unoccupied.

2. The method of claim 1, wherein:
    the first received signal power comprises a received signal strength indication (RSSI) measured by the user equipment on the second subchannel; and
    the second received signal power comprises an RSSI measured by the user equipment on the first subchannel.

3. The method of claim 1, further comprising:
    measuring a received signal strength indication (RSSI) on the second subchannel;
    deriving the estimate of leakage;
    subtracting the estimate of leakage from the RSSI on the second subchannel to provide an adjusted RSSI; and
    comparing the adjusted RSSI to the channel occupancy threshold;
    wherein designating the second subchannel as unoccupied is based on the comparing the adjusted RSSI to the channel occupancy threshold.

4. The method of claim 3, wherein deriving the estimate of leakage comprises:
    estimating a signal power mask for another user equipment that transmitted the first data on the first subchannel; and
    estimating signal leakage based on the signal power mask and the RSSI on the second subchannel.

5. The method of claim 3, wherein deriving the estimate of leakage comprises:
    estimating a pathloss from the user equipment to another user equipment that transmitted the first data on the first subchannel; and
    estimating signal leakage based on the pathloss and a defined leakage parameter.

6. The method of claim 3, wherein:
    the channel occupancy threshold comprises a sidelink RSSI (S-RSSI) channel occupancy threshold.

7. The method of claim 1, wherein:
    the first received signal power comprises a received signal strength indication (RSSI) measured by the user equipment on the second subchannel; and
    the channel occupancy threshold comprises a sidelink RSSI (S-RSSI) channel occupancy threshold.

8. The method of claim 1, further comprising:
    determining that the second subchannel is immediately adjacent the first subchannel within the plurality of subchannels; and
    initiating an attempt to decode the second data on the second subchannel after determining that the second subchannel is immediately adjacent the first subchannel.

9. The method of claim 1, further comprising:
    determining that a third subchannel is immediately adjacent the second subchannel within the plurality of subchannels;
    failing to successfully decode third data on the third subchannel after determining that the third subchannel is immediately adjacent the second subchannel; and
    designating the third subchannel as unoccupied after failing to successfully decode the third data on the third subchannel; and
    calculating the CBR for the user equipment is-further based on the designating the third subchannel as unoccupied.

10. The method of claim 1, further comprising:
    selecting a subset of subchannels of the plurality of subchannels based on the CBR; and
    transmitting information to another user equipment via the subset of subchannels.

11. The method of claim 1, wherein the plurality of subchannels comprise subchannels allocated for vehicle to anything (V2X) communication.

12. The method of claim 11, wherein the V2X communication comprises $3^{rd}$ Generation Partnership Project (3GPP) Long Term Evolution V2X communication or 3GPP 5G V2X communication.

13. The method of claim 1, wherein the designating the second subchannel as unoccupied is further based on the first received signal power associated with the second subchannel being greater than a channel occupancy threshold.

14. A user equipment, comprising:
    one or more memories that store processor-executable code; and
    one or more processors configured to execute the processor-executable code and cause the user equipment to:
        decode first data received on a first subchannel of a plurality of subchannels;
        calculate a first received signal power associated with a second subchannel of the plurality of subchannels based on an estimate of leakage from the first subchannel to the second subchannel;
        designate the second subchannel as unoccupied based on a failure to successfully decode second data on the second subchannel, wherein the designation of the second subchannel as unoccupied is further based on the first received signal power associated with the second subchannel being less than a second received signal power associated with the first subchannel; and transmit a first transmission via the second subchannel according to a channel busy ratio (CBR) for the user equipment that is based on the designation of the second subchannel as unoccupied.

15. The user equipment of claim 14, wherein:
the first received signal power comprises a received signal strength indication (RSSI) measured by the user equipment on the second subchannel; and
the second received signal power comprises an RSSI measured by the user equipment on the first subchannel.

16. The user equipment of claim 14, wherein the one or more processors are further configured to execute the processor-executable code and cause the user equipment:
measure a received signal strength indication (RSSI) on the second subchannel;
derive the estimate of leakage;
subtract the estimate of leakage from the RSSI on the second subchannel to provide an adjusted RSSI; and
compare the adjusted RSSI to the channel occupancy threshold;
wherein the designation of the second subchannel as unoccupied is based on the comparison of the adjusted RSSI to the channel occupancy threshold.

17. The user equipment of claim 16, wherein the one or more processors are further configured to execute the processor-executable code and cause the user equipment:
estimate a signal power mask for another user equipment that transmitted the first data on the first subchannel; and
estimate signal leakage based on the signal power mask and the RSSI on the second subchannel.

18. The user equipment of claim 16, wherein the one or more processors are further configured to execute the processor-executable code and cause the user equipment:
estimate a pathloss from the user equipment to another user equipment that transmitted the first data on the first subchannel; and
estimate signal leakage based on the pathloss and a defined leakage parameter.

19. The user equipment of claim 16, wherein:
the channel occupancy threshold comprises a sidelink RSSI (S-RSSI) channel occupancy threshold.

20. The user equipment of claim 14, wherein:
the first received signal power comprises a received signal strength indication (RSSI) measured by the user equipment on the second subchannel; and
the channel occupancy threshold comprises a sidelink RSSI (S-RSSI) channel occupancy threshold.

21. The user equipment of claim 14, wherein the one or more processors are further configured to execute the processor-executable code and cause the user equipment:
determine that the second subchannel is immediately adjacent the first subchannel within the plurality of subchannels; and
initiate an attempt to decode the second data on the second subchannel after determining the determination that the second subchannel is immediately adjacent the first subchannel.

22. The user equipment of claim 14, wherein the one or more processors are further configured to execute the processor-executable code and cause the user equipment:

determine that a third subchannel is immediately adjacent the second subchannel within the plurality of subchannels;
fail to successfully decode third data on the third subchannel after the determination that the third subchannel is immediately adjacent the second subchannel; and
designate the third subchannel as unoccupied after the failure to successfully decode the third data on the third subchannel;
calculate the CBR for the user equipment further based on the designation of the third subchannel as unoccupied.

23. The user equipment of claim 14, wherein the one or more processors are further configured to execute the processor-executable code and cause the user equipment:
select a subset of subchannels of the plurality of subchannels based on the CBR; and
transmit information to another user equipment via the subset of subchannels.

24. The user equipment of claim 14, wherein the plurality of subchannels comprise subchannels allocated for vehicle to anything (V2X) communication.

25. The user equipment of claim 24, wherein the V2X communication comprises $3^{rd}$ Generation Partnership Project (3GPP) Long Term Evolution V2X communication or 3GPP 5G V2X communication.

26. The user equipment of claim 14, wherein the designation of the second subchannel as unoccupied is further based on the first received signal power associated with the second subchannel being greater than a channel occupancy threshold.

27. A user equipment, comprising:
means for decoding first data on a
means for calculating a first received signal power associated with a second subchannel of the plurality of subchannels based on an estimate of leakage from the first subchannel to the second subchannel;
means for designating the second subchannel as unoccupied based on a failure to successfully decode second data on the second subchannel, wherein the designating the second subchannel as unoccupied is further based on the first received signal power associated with the second subchannel being less than a second received signal power associated with the first subchannel; and
means for transmitting a first transmission via the second subchannel according to a channel busy ratio (CBR) for the user equipment that is based on the designating the second subchannel as unoccupied.

28. A non-transitory computer-readable medium having stored therein instructions executable by one or more processors of a user equipment to:
decode first data on a first subchannel of a plurality of subchannels;
calculate a first received signal power associated with a second subchannel of the plurality of subchannels based on an estimate of leakage from the first subchannel to the second subchannel;
designate the second subchannel as unoccupied based on a failure to successfully decode second data on the second subchannel, wherein the designation of the second subchannel as unoccupied is further based on the first received signal power associated with the second subchannel less than a second received signal power associated with the first subchannel; and
transmit a first transmission via the second subchannel according to a channel busy ratio (CBR) for the user equipment that is based on the designation of the second subchannel as unoccupied.

\* \* \* \* \*